April 9, 1940.　　　O. G. PRINCE　　　2,196,427
SELF-ACTING BRAKE
Filed Oct. 21, 1939
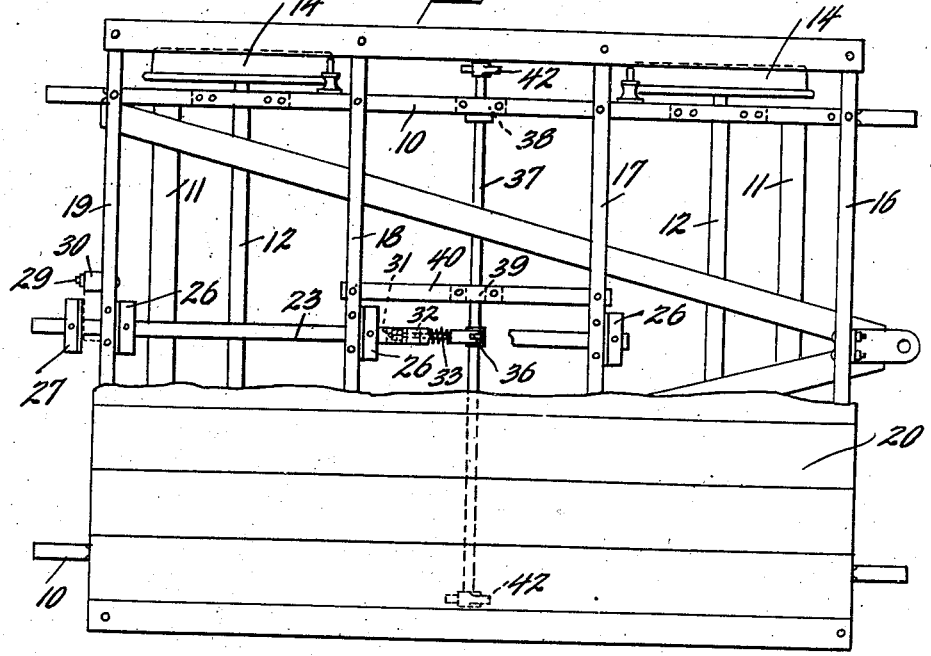
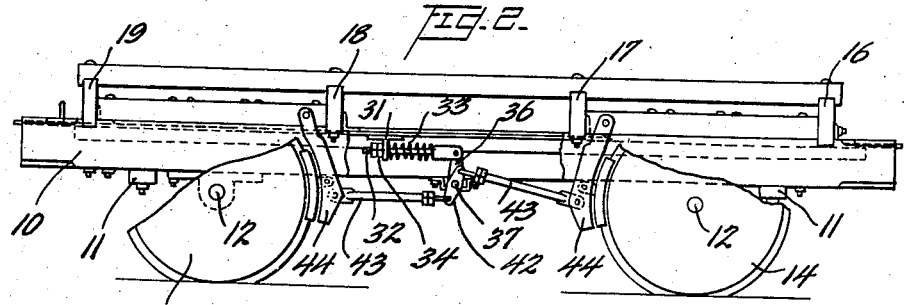
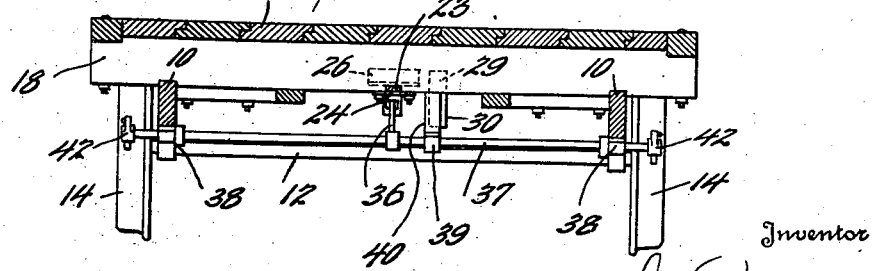
Inventor
Oscar G Prince
By Henry H. Snelling
His Attorney Patented Apr. 9, 1940

2,196,427

UNITED STATES PATENT OFFICE 2,196,427

SELF-ACTING BRAKE

Oscar G. Prince, Godfrey, Ga.

Application October 21, 1939, Serial No. 300,623

2 Claims. (Cl. 188—142)

This invention relates to self-acting brakes for vehicles of various kinds and has for its principal object the provision of a brake system particularly adaptable to railway trailer cars and push cars wherein the brakes may be automatically applied by a straight line action of the pull bar of the car.

A further object of the invention consists in the provision of a push car brake system substantially foolproof and which can be applied to existing push cars with very slight and inexpensive changes.

In the drawing:

Figure 1 is a top plan view of a push car employing my invention.

Figure 2 is a side elevation.

Figure 3 is a vertical section taken approximately centrally of the car.

In railway work it is usual to use a motor car to haul one or more push cars and this invention provides means for preventing a push car when so held from running upon the motor car in absence of tractive pull as for example when the cars are moving down-grade. In such a case with my invention the coupling between the motor car and the push car is moved directly rearward, this movement allowing a spring to apply the brakes to the wheels of the push car by a regulated amount, making it safe to draw a heavy load by a motor car since the trailer car is always under control, although the push car brake can readily be locked out of action by simple means.

The frame of the car is composed of the usual longitudinal members 10 connected front and back by the transverse members 11. This frame rests upon the axles 12 carrying the standard push car wheels 14. Upon this frame are mounted sills 16, 17, 18, and 19, supporting the flooring 20 here shown as having the usual ship-lap joints as is customary.

The three forward sills are each recessed centrally to receive a draw bar 23 resting upon iron flats 24 bolted to the bottom of the sills. To the rear of each sill a transverse angle iron 26 is secured and a similar angle iron 27 reversed in position is bolted to the draw bar 23 a chosen distance forwardly of the front sill 19. This construction affords free longitudinal movement of the draw bar as determined by engagement of the front stop 27 on the rearward stroke and by the simultaneous engagement of the other three stops 26 when the draw bar is moved forwardly, as when the car is pulled.

To the front sill 19 I pivot as at 29 a spacer block 30 which can be swung into position so as to engage the front angle iron 27 on the draw bar and thus prevent appreciable rearward movement of the draw bar.

A reasonably heavy T 31 is secured to the draw bar 23 between the sills 17 and 18 and this is perforated to receive loosely a link 32 carrying a spring 33, the tension of which is adjusted by means of nuts 34 on the forward threaded end of the link 32. The link 32 is pivoted to a crank arm 36 fastened centrally to the brake rod 37 which is supported in bearings 38 on the longitudinal members 10 and on a similar bearing 39 on a beam 40, carried by the sills 17 and 18. Beyond the bearings 38 the brake rod 37 carries the two brake levers 42 each of which is connected by two links 43 to the brake shoe hangers 44 which may be, and preferably are, of the standard type used on the motor cars which pull the push cars.

When the motor car is coupled to the draw bar 23 and pulls the trailer car up a grade or at a steady speed the draw bar is pulled forwardly until all three of the angle iron stops 26 are in firm engagement with their respective sills. This pulls the vertically extended crank 36 forwardly, moving the levers 42 in counter-clockwise direction which moves the brake hangers and shoes away from the wheels. Should it be desired to move the trailer car or cars both forwardly and backwardly the spacer block 30 can be swung through three quarters of a revolution in a position to lock the draw bar in such position. Ordinarily, however, when the cars start down-hill the rear pulled car tends to overtake the motor car. Under such conditions a rearward movement is given to the draw bar 23 and this compresses the spring 33 and moves the crank 36 and lever 42 in a clockwise direction, applying the brakes, thus relieving the motor car of the necessity of holding back the cars.

What I claim is:

1. In a trailer car of the type having a frame and transverse sills, a draw bar slidable in a plurality of said sills, stop members on the draw bar simultaneously engaging said sills as the draw bar is pulled forwardly, a stop on said draw bar for engaging a portion of the car to limit rearward movement of the draw bar, brake mechanism including a brake rod, levers, links and brake hangers for decelerating the car, a crank on said brake rod, a link loosely connecting said crank with the draw bar, so that forward movement of the draw bar will pull the crank to move the brake rod into brake releasing position, and a spring confined on said link between the draw bar and the crank so as to transmit rearward motion of the draw bar to the crank to move the brake rod to brake applying position.

2. In a follower car of the type described, a draw bar slidable in a straight line, stops on said draw bar, stops engageable therewith located on fixed parts of the car so that forward movement of the draw bar will pull the car forwardly, means to limit rearward movement of the draw bar with respect to the car, a braking mechanism including a lever, a headed link pivoted to said lever, a member carried by the draw bar loosely receiving said link and engaging the head thereof to move the braking mechanism to "off" position when the draw bar is pulled forward, and a spring between said member and said lever to urge the lever to "on" position when the draw bar is moved rearwardly.

OSCAR G. PRINCE.